United States Patent [19]
Gustafsson

[11] Patent Number: 6,006,695
[45] Date of Patent: Dec. 28, 1999

[54] CLAW FOR A MILKING MACHINE

[75] Inventor: Marie-Louise Gustafsson, Stockholm, Sweden

[73] Assignee: Alfa Laval Agri AB, Tumba, Sweden

[21] Appl. No.: 09/125,057

[22] PCT Filed: Dec. 2, 1996

[86] PCT No.: PCT/SE96/01586

§ 371 Date: Aug. 4, 1998

§ 102(e) Date: Aug. 4, 1998

[87] PCT Pub. No.: WO97/27736

PCT Pub. Date: Aug. 7, 1997

[30] Foreign Application Priority Data

Feb. 5, 1996 [SE] Sweden ................................ 9600412
Feb. 5, 1996 [SE] Sweden ................................ 9600413

[51] Int. Cl.⁶ .......................................................... A01J 5/00
[52] U.S. Cl. .......................................................... 119/14.54
[58] Field of Search ............................... 119/14.1, 14.54, 119/14.45, 14.55

[56] References Cited

U.S. PATENT DOCUMENTS

| | | |
|---|---|---|
| 2,429,983 | 11/1947 | Bender et al. . |
| 2,775,225 | 12/1956 | Brown et al. . |
| 3,014,455 | 12/1961 | Olander . |
| 3,029,787 | 4/1962 | Lamberson . |
| 3,094,099 | 6/1963 | Bertao . |
| 5,291,853 | 3/1994 | Steingraber et al. ................. 119/14.54 |
| 5,345,890 | 9/1994 | Petersson et al. .................... 119/14.54 |

FOREIGN PATENT DOCUMENTS

| | | |
|---|---|---|
| 74799 | 9/1952 | Denmark . |
| 377482 | 5/1985 | European Pat. Off. . |
| 418260 | 1/1995 | European Pat. Off. . |
| 977930 | 12/1948 | France . |
| 1158460 | 3/1956 | France . |
| 104989 | 7/1942 | Sweden . |
| 133288 | 10/1951 | Sweden . |
| 449154 | 4/1987 | Sweden . |
| WO9423562 | 10/1994 | WIPO . |

*Primary Examiner*—Peter M. Poon
*Assistant Examiner*—Yvonne R. Abbott
*Attorney, Agent, or Firm*—Hovey, Williams, Timmons & Collins

[57] ABSTRACT

A claw for a milking machine comprises a housing (1) defining an inner space, at least one inlet member (8, 9) which via a milk conduit (10) is intended to connect the inner space of the housing to a teat of an animal to be milked, and an outlet pipe (6) which via a conduit member is intended to connect the inner space of the housing (1) to a milk collecting member of the milking machine. The housing (1) has a center axis (5) extending through the claw in a downward direction and essentially vertically when the claw is in an operating position. Said inlet member (8, 9) is provided, with respect to the center axis, below the outlet pipe (6) in said operating position. The outlet pipe (6) extends obliquely downwardly in a direction (7) forming an acute angle (4) with the center axis (5).

13 Claims, 3 Drawing Sheets

CLAW FOR A MILKING MACHINE

BACKGROUND OF THE INVENTION

1. Field of the Invention

The present invention refers to a claw for a milking machine, comprising a housing defining an inner space, at least one inlet member, which via a milk conduit is intended to connect the inner space of the housing to a teat of an animal to be milked, and an outlet pipe which via a conduit member is intended to connect the inner space of the housing to a milk collecting member of the milking machine, the housing having a center axis extending through the claw in a downward direction and essentially vertically when the claw is in an operating position, and said inlet members being provided, with respect to the center axis, below the outlet pipe in said operating position.

2. Description of the Prior Art

One milking claw is known from EP-B418 260 and comprises a housing having a center axis which in the operating position of the claw extends vertically, an upper portion and a lower portion. The inner space of the housing forms a chamber for receiving milk via four inlet openings which via short milk conduits are connected to a respective teatcup of the milking machine. From the chamber extends an outlet member, which via a milk conduit is connected to a milk collecting unit of the milking machine. Both the outlet member and the inlet openings are fixedly provided on the upper portion of the housing and thus are not movable in relation to each other. The outlet member comprises an outlet nipple which extends radially outwardly, perpendicularly from the center axis of the housing. The inlet openings are provided in pairs in such a manner that one of the pairs is intended to be connected to the teatcups to be applied to the front teats of the cow and the rear pair is intended for the teatcups to be applied to the rear teats of the cow. The inlet openings are provided on a conical surface of the upper portion at the same height with respect to the vertical center axis.

Since the milk conduit is comprised of a relatively heavy and rigid transport hose, a torque acts on the claw in a vertical direction. This means that the claw will be turned downwardly and the load is not uniformly distributed to the different teats. Such an uneven load may result in an obstruction of the milk flow from certain teats and in the fact that the milk yield from the udder is hindered.

It is known to utilize devices, for example in the form of an arm, which hold the claw and/or the milk conduit in a proper position. Despite the fact that such auxiliary equipment makes the milking plant more expensive, such devices are hindering and require additional work to be applied.

SE-B-449 154 discloses a milking machine having another type of claw comprising a housing having an upper portion and a lower portion. The upper portion is provided with four inlet nipples, which via conduits connect the inner space of the housing to a respective teatcup of the milking machine, and the lower portion is provided with four outlet nipples, which via conduits connect the inner space of the housing to a milk-collecting member of the milking machine. In the inner space of the housing there are four partition walls dividing the inner space of the housing into four equal chambers, an inlet nipple and an outlet nipple being connected to each chamber. The upper portion may be rotated in fixed 90° steps in relation to the lower portion in such a manner that each inlet nipple may be displaced to be opposite another outlet nipple. Thus, the four outlet nipples are located below the inlet nipples and extend outwardly and obliquely downwardly in such a manner that the milk conduit will describe a curved path.

U.S. Pat. No. 2,429,983 discloses another claw having four inlet nipples located at the top and an outlet nipple located in a lower portion of the claw and extending obliquely downwardly.

In both of these known claws, however, the outlet nipples are directed obliquely downwardly to facilitate the milk flow from the claw and not in order to reduce the torque of the milk conduit acting on the claw.

Another problem connected to the horizontal outlet nipple is that the person handling the claw frequently is gripping the claw about the outlet nipple. The claw together with all hoses and teatcups is relatively heavy and the horizontal extension of the outlet nipple is disadvantageous from an ergonomic point of view, since it results in a grip leading to a great stress on the wrist.

SUMMARY OF THE INVENTION

The object of the present invention is to overcome the problems discussed above and provide a claw ensuring a uniform load on each teat. Furthermore, an object is to provide a claw which may be handled in an ergonomically proper way.

This object is obtained by the claw initially defined and characterized in that the outlet pipe extends obliquely downwardly in a direction forming an acute angle with the center axis.

By such a configuration of the outlet pipe it is compensated for the downwardly turning force applied to a claw by the long and heavy milk conduit. Consequently, the pulling force applied by every teatcup to its respective teat will be essentially equal, which ensures a uniform milk flow from each teat. Furthermore, by such an outlet nipple a handle is obtained, which in a very convenient manner may be gripped by the person handling the claw, and this person may hold the claw in position by a reduced effort during the attachment of the different teatcups to their respective teat. Thereby, the load on the wrist of the person handling the claw will be lower than in the case of a horizontal outlet nipple.

Advantageous embodiments of the claw are defined in the dependent claims.

According to one embodiment of the invention, said acute angle is between about 20° and 85°. By such an angle an ergonomically advantageous gripping is ensured as well as a distribution of the pulling force acting on the different teats. According to further embodiments said angle may be between 60° and 80°, for example about 70°.

According to a further embodiment of the invention, a distributing member is provided on the claw, which comprises a first pipe portion extending in parallel with the outlet pipe and being intended to be connected to a first pulsation conduit arranged to transfer a pulsating vacuum from the milking machine to the distributing member. In such a manner, the pulsation hoses, usually two, extending between the claw and the milking machine will extend in parallel with the milk conduit in the same advantageous downwardly directed path. Furthermore, the distributing member may comprise at least a second pipe portion extending in a direction forming an angle with the first pipe portion and being intended to be connected to a second pulsation conduit arranged to transfer said pulsating vacuum from the distributing member to a teatcup.

According to a further embodiment of the invention, a valve device is displaceable in a direction between an open position, in which the outlet pipe is connected to the inner space, and a closed position, in which the connection between the outlet pipe and the inner space is essentially closed, and thereby the valve device may be displaceable between about 70° and 110° in relation to the direction of the outlet pipe. In such a manner it is ensured that the valve device may be operated in a convenient manner being advantageous from an ergonomical point of view by the person handling the claw. Thereby, the person may hold the claw in a steady grip around the outlet pipe and simultaneously operate the valve device by the thumb in an easy manner.

Thereby, according to an advantageous embodiment the valve device may be displaceable essentially perpendicularly to the direction of the outlet pipe.

According to a further embodiment of the invention, the outlet pipe is provided on a first portion of the housing, the inlet member on a second portion of the housing and the first portion is rotatable in relation to the second portion. By such an embodiment, the outlet pipe may be rotated in relation to the inlet members in such a manner that it is directed towards the milk-collecting member of the milking machine, i.e. the milk conduit will not exert any torsional force to the claw in a horizontal direction, but the claw may take an optimal operating position in relation to the teats of the animal. Thereby, the two portions may be rotatable between different fixed positions in such a manner that the milk conduit will be directed essentially forwardly if the milking machine is located in front of the animal to be milked and laterally if the milking machine is located on either side of the animal to be milked, or rearwardly if the milking machine is located behind the animal.

According to a further embodiment, the claw comprises four inlet members and these are provided in pairs in such a manner that they are adapted to the natural position of the teats on the udder of the animal, a first pair of the inlet members being intended to be connected to two front teats of the animal and a second pair of the inlet members being intended to be connected to the two rear teats of the animal. By such a configuration of the claw being adapted to the animal, it is ensured that the teatcups reach their respective teats in a better way and thereby the engagement of the teatcup liners of their respective teats is improved. Furthermore, the stresses in the teatcup liners are reduced and the claw will hang down in a more natural manner beneath the animal. Thereby, the first pair of inlet members may be located at a higher position with respect to the center axis than the second pair of the inlet members. In normal cases, the front teats of a cow are located at a higher position than the rear teats. By this embodiment, one may compensate for this fact in such a manner that the downwardly directed force in each teat is equal and that the center axis of the claw will extend vertically during the milking. The vertical operating position for the claw is advantageous since the milk collected in the inner space of the claw may be transported therefrom in a uniform and continuous flow. Furthermore, the distance between the inlet members of the first pair may be greater than the corresponding distance of the second pair. In such a manner the fact is taken into account that the front teats of the cow in normal cases have a greater mutual distance than the rear teats of the cow.

BRIEF DESCRIPTION OF THE DRAWINGS

The present invention is now to be explained more closely by means of different embodiments and with reference to the drawings attached.

DETAILED DESCRIPTION OF DIFFERENT EMBODIMENTS

Figure 1:
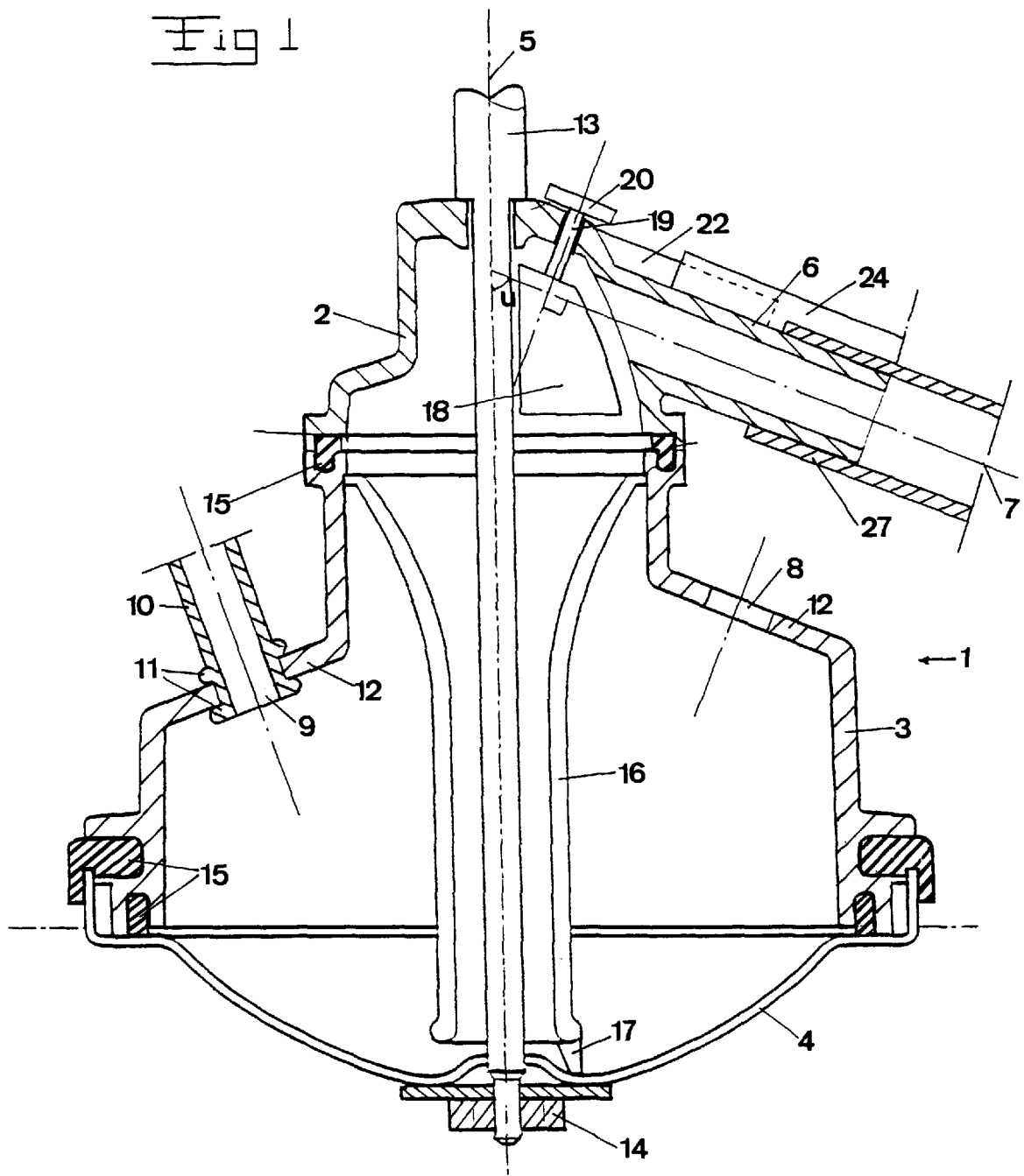
FIG. 1 discloses a vertical section through a claw according to an embodiment of the invention.

FIG. 1 discloses a claw according to the invention. The claw comprises a housing 1 having a first upper portion 2, a second intermediate portion 3 and a third lower portion 4. Through the housing a center axis 5 extends, which is essentially vertical when the claw is in an optimal operating position. On the upper portion 2, an outlet pipe 6 is provided which extends obliquely downwardly in a direction 7 forming an acute angle u with the center axis 5. This angle u is between about 20° and 85°, preferably between 60° and 80°, for example 65°, 70°, 75°. On the intermediate portion 3 four inlet members 8, 9 are provided. Each inlet member 8, 9 comprises an inlet opening or an inlet passage extending through the wall of the housing 1 and being adapted to receive a short milk conduit 10 fixed to the wall of the housing 1 by means of two ribs 11 surrounding the milk conduit 10. Each such short milk conduit 10, which in practice frequently is a prolongation of a teatcup liner, is a standard product which preferably is manufactured in one single length. In such a manner, the manufacturing of the short milk conduits/teatcup liners is facilitated and replacement thereof is simplified since it is not necessary to take into account the positioning of individual teatcup liners 10. The wall of the housing 1 defines an inner space and comprises around each inlet member 8, 9 a wall portion 12 through which the passage 8, 9 extends. This wall portion 12 is essentially plane parallel, i.e. the outer surface of the portion 12 is essentially parallel with the inner surface thereof and these surfaces are essentially plane. This means that the ribs 11 may sealingly close in such a manner that no air may penetrate between the edge side of the passage 8, 9 and the milk conduit 10 introduced into the passage 8. It is also to be noted that each passage 8, 9 extends in a direction being essentially perpendicular to the respective wall portion 12, i.e. the edge side of the passages 8, 9 is essentially perpendicular to the outer surface and the inner surface of the wall portion 12. Thereby, the sealing capacity of the milk conduits against the housing 1 about the passage 8, 9 is further improved. In the area between the wall portions 12, the housing may have an arbitrary shape. The four inlet members 8, 9 are provided in pairs in such a manner that the first pair 8 which is intended for two front teats of a cow to be milked is located at a higher position with respect to the vertical center axis 5 than a second pair 9, which is intended for the rear teats of the cow, cf. also FIG. 3. Furthermore, the four inlet members 8, 9 are arranged in such a manner that the passage of the actual inlet member extends in said direction through the wall of the housing 1 in such a manner that the two front inlet members 8 extend obliquely forwardly and outwardly and the two rear inlet members 9 extend obliquely rearwardly and outwardly. Furthermore, as is disclosed in FIG. 4, the mutual distance between the front inlet members 8 is greater than the corresponding distance between the rear inlet members 9.

The claw is held together by means of a bolt 13 extending along the center axis 5 through the whole claw. The bolt 13 has a shoulder abutting the upper portion 2 and in its lower portion a thread onto which a nut 14 is screwed. According to an alternative embodiment, the nut may be located above the upper portion 2, in which case the rod, for instance, is attached to the lower portion 4. Between the upper portion 2 and the intermediate portion 3 as well as between the intermediate portion 3 and the lower portion 4, sealing rings 15 are provided. By tightening the nut 14 the three portions 2, 3 and 4 are pressed against each other and the upper portion may be locked in an arbitrary rotational position in relation to the intermediate portion 3. The upper portion 2 and the intermediate portion 3 may also be adapted to engage each other in determined rotational positions, for example four positions in such a manner that the outlet pipe 6 is directed forwardly, rearwardly or laterally.

In the inner space of the housing a suction pipe 16 is provided. The latter extends in the direction of the center axis 5 and is provided at a distance from the bottom of the housing 1 by means of support members 17.

Furthermore, the claw is provided with a valve device comprising a valve body 18 arranged to be in an open position in which the outlet pipe 6 is connected to the inner space of the housing 1, and a closed position, in which the valve body 18 closes the connection between the outlet pipe 6 and the inner space. The valve body 18 is via a connecting member 19 in the shape of a rod fixedly connected to a manoeuvring member 20 in the shape of a plate. The rod 19 extends through a passage in the upper portion 2 in such a manner that the valve body 18 may be displaced upwardly and downwardly between the open and closed positions. The rod 19 is displaceable in a direction forming an angle of between about 70° and 110° with the direction 7 of the outlet pipe 6. For instance, this angle may be about 80°, 90° or 100°.

Figure 2:
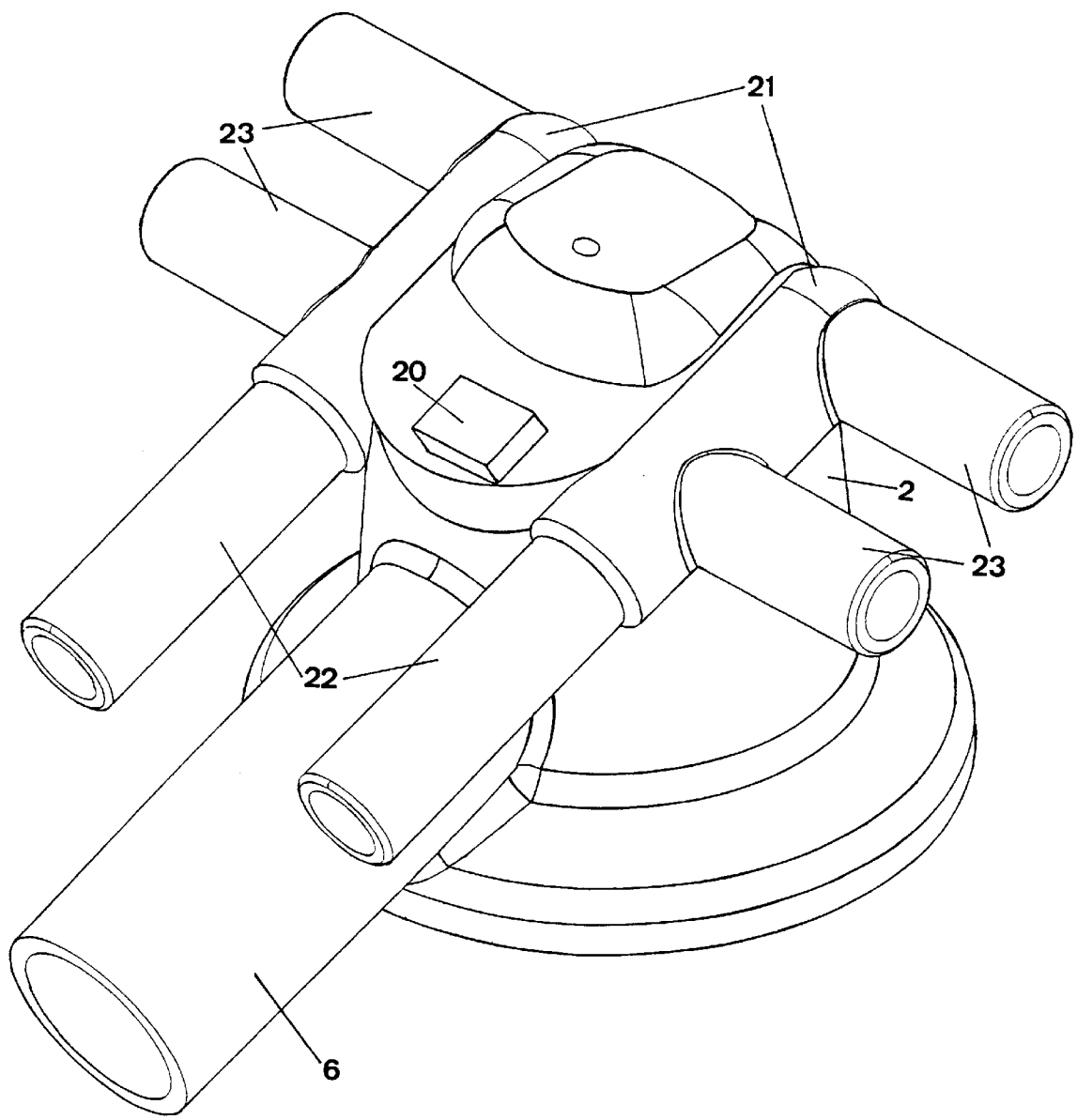
FIG. 2 discloses a view obliquely from above of an upper portion of a claw according to an embodiment of the invention.

As is disclosed in FIG. 2, the claw comprises two distributing members 21 provided on the upper portion 2. Each distributing member 21 comprises a first pipe portion 22 extending in a direction being parallel with the direction 7 of the outlet pipe 6. Furthermore, each distributing member 21 comprises two second pipe portions 23 extending in a direction forming an angle with the first pipe portion 22. The first pipe portions 22 are intended to be connected with a respective first pulsation conduit 24 (see FIG. 1) arranged to transfer a pulsating vacuum from the milking machine to the distributing member 21. The second pipe portions 23 are arranged to be connected to a respective pulsation conduit 25 (see FIG. 3) arranged to transfer said pulsating vacuum to a pulsation chamber of a claw 26, see FIGS. 3 and 4).

The outlet pipe 6 of the claw is intended to be connected to a long milk conduit 27 (see FIG. 1) extending between the claw and the milking machine. Due to the fact that the first pipe portions 22 and the outlet pipe 6 extend in parallel with each other, the long milk conduit 27 and the first pulsation conduits 24 may in an easy manner be connected to a conduit bundle 28, see FIGS. 3 and 4.

The claw disclosed functions in the following way. Milk is sucked from the teatcups 26 via the short milk conduits 10 and the inlet members 8, 9 into the inner space of the housing 1. From there the milk is sucked via a suction pipe 16 up to the upper portion 2 of the claw and out through the outlet pipe 6 and the long milk conduit 27 to a schematically disclosed milk collecting member 29 of a milking machine (not disclosed). The conduit bundle 28 is necessarily relatively rigid and heavy and will therefore exert significant torsional forces to the claw. By the outlet pipe 6 directed downwardly the torque tending to turn the claw downwardly may be reduced and the conduit bundle 28 will extend in a soft curved path. Furthermore, the upper portion 2 may preferably be adjusted in such a manner that the outlet pipe 6 will be directed essentially in the direction towards the milk collecting member 29.

Figure 3:
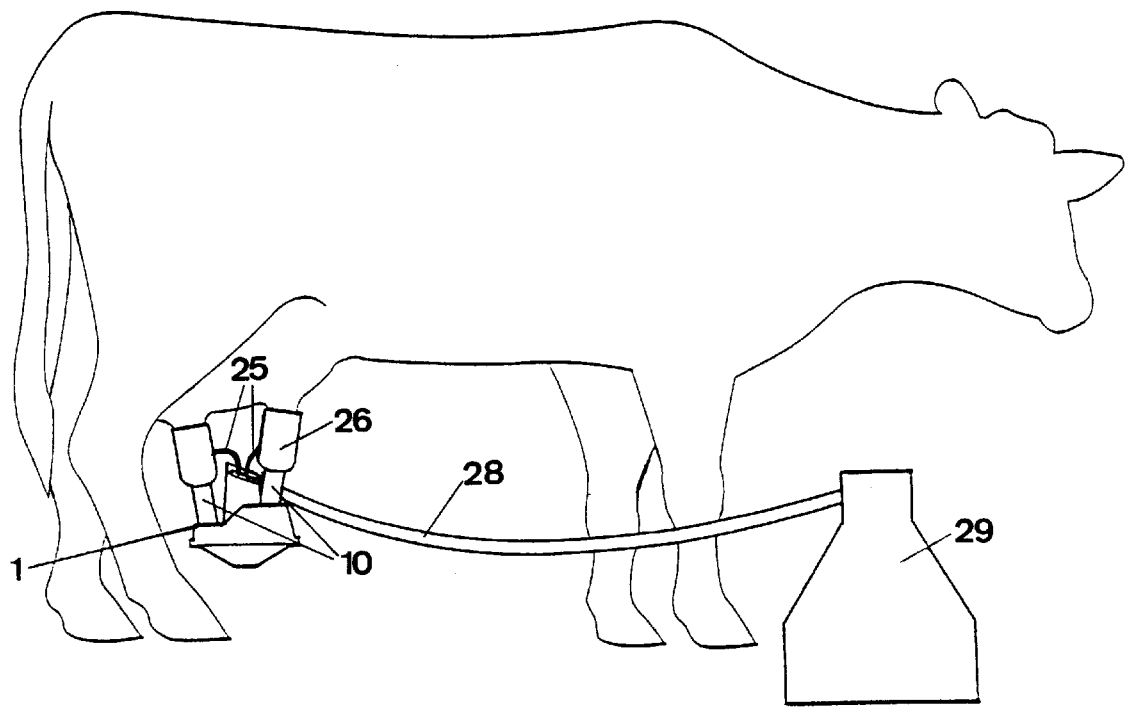
FIG. 3 discloses a side-view of an animal during milking by means of a claw according to the invention.
Figure 4:
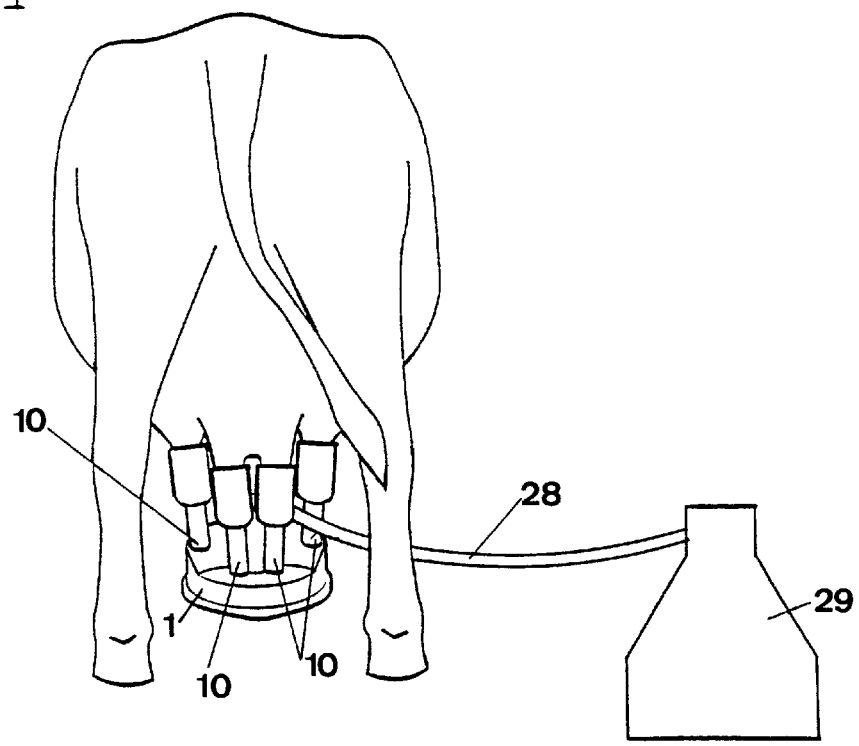
FIG. 4 discloses a view from behind of an animal during milking by means of a claw according to the invention.

As is disclosed in FIGS. 3 and 4, the claw will, due to the inventive configuration, hang down horizontally, i.e. the center axis 5 will be vertical. Because of this the pulling force acting on each teat in the downward direction will be essentially equal and thereby an equal and uniform milking of each teat is ensured. Furthermore, the horizontal position means that the milk collected in the inner space of the claw may be transported away therefrom in a uniform and continuous flow, thereby reducing the risk of so called impact and back-flow.

The present invention is not limited to the embodiments disclosed herein but may be varied and modified within the scope of the features defined in the subsequent claims.

I claim:
1. A claw for a milking machine comprising;

a housing defining an inner space;

at least one inlet member, which is intended to connect the inner space of the housing via a milk conduit to a teat of an animal to be milked; and an outlet pipe which is intended to connect the inner space of the housing to a milk collecting member of the milking machine via a conduit member, the housing having a center axis extending through the claw in a downward direction and essentially vertically when the claw is in an operating position, and said inlet members being provided, with respect to the center axis, below the outlet pipe in said operating position, wherein the outlet pipe extends obliquely downwardly in a direction forming an acute angle with the center axis.

2. A claw according to claim 1, wherein said acute angle is between about 20° and 85°.

3. A claw according to claim 1, wherein said acute angle is between about 60° and 80°.

4. A claw according to claim 1, wherein said acute angle is about 70°.

5. A claw according to claim 1, including a distributing member provided on the claw and comprising a first pipe portion extending in parallel with the outlet pipe and intended to be connected to a first pulse conduit arranged to transfer a pulsating vacuum from a milking machine to the distributing member.

6. A claw according to claim 5, wherein the distributing member comprises at least a second pipe portion extending in a direction forming an angle with the first pipe portion and intended to be connected to a second pulse conduit arranged to transfer said pulsating vacuum from the distributing member to a pulsation chamber of a teatcup.

7. A claw according to claim 1, including a valve device being displaceable in a direction between an open position, in which the outlet pipe is connected to the inner space, and a closed position, in which said connection between the outlet pipe and the inner space is essentially closed, and in that the valve device is displaceable in a direction forming an angle with the direction of the outlet pipe which is between about 40° and 110°.

8. A claw according to claim 7, wherein the valve device is displaceable essentially perpendicularly to the direction of the outlet pipe.

9. A claw according to claim 1, wherein said housing includes a wall, said inlet member comprises a passage extending through the wall of the housing and being arranged to receive the milk conduit in such a manner that it extends through the passage.

10. A claw according to claim 9, wherein the distance between the inlet members of the first pair is greater than the corresponding distance of the second pair.

11. A claw according to claim 1, wherein the outlet pipe is provided on a first portion of the housing, said inlet member is provided on a second portion of the housing, and the first portion is rotatable in relation to the second portion.

12. A claw according to claim 1, wherein it comprises four inlet members and that these are provided in pairs in such a manner that they are adapted to the natural position of the teats on the udder of the animal, a first pair of the inlet members being intended to be connected to two front teats of the animal and a second pair of the inlet members being intended to be connected to the two rear teats of the animal.

13. A claw according to claim 11, wherein the first pair of the inlet members is located at a higher position with respect to the center axis than the second pair of the inlet members.

* * * * *